(12) United States Patent
Schlaupitz

(10) Patent No.: US 6,223,533 B1
(45) Date of Patent: May 1, 2001

(54) PRESSURIZED FLUID DEVICE

(75) Inventor: Manfred Schlaupitz, Kongsberg (NO)

(73) Assignee: Kongsberg Automotive ASA, Kongsberg (NO)

( * ) Notice: Subject to any disclaimer, the term of this patent is extended or adjusted under 35 U.S.C. 154(b) by 0 days.

(21) Appl. No.: 09/269,397

(22) PCT Filed: Sep. 26, 1997

(86) PCT No.: PCT/NO97/00264

§ 371 Date: May 18, 1999

§ 102(e) Date: May 18, 1999

(87) PCT Pub. No.: WO98/13627

PCT Pub. Date: Apr. 2, 1998

(30) Foreign Application Priority Data

Sep. 27, 1996 (NO) .................................................. 964130

(51) Int. Cl.[7] .................................................. B60T 13/20
(52) U.S. Cl. .................................................. 60/555; 60/571
(58) Field of Search ............................. 60/555, 571, 422; 91/433, 459

(56) References Cited

U.S. PATENT DOCUMENTS

| 4,543,856 | 10/1985 | Klatt | ..................... 74/866 |
|---|---|---|---|
| 4,635,439 | 1/1987 | Wible | ..................... 60/420 |
| 4,813,339 | * 3/1989 | Uno et al. | ..................... 91/459 |
| 5,017,094 | * 5/1991 | Graf et al. | ..................... 417/218 |

FOREIGN PATENT DOCUMENTS

| 0 703 389 | 3/1996 | (EP) . |
|---|---|---|
| WO 91/19108 | 12/1991 | (WO) . |

* cited by examiner

*Primary Examiner*—Edward K. Look
*Assistant Examiner*—Thomas E. Lazo
(74) *Attorney, Agent, or Firm*—Finnegan, Henderson, Farabow, Garrett & Dunner, L.L.P.

(57) ABSTRACT

A primary pipe system includes a master cylinder with corresponding pressure sensor that produces a primary electrical signal. A secondary pipe system includes a working cylinder with a pressure sensor that produces a secondary electrical signal. The secondary pipe system generates a secondary pressure on the working cylinder as a function of the primary electrical signal. A computer continuously processes the primary and secondary electrical signals to transmit an electrical signal at a fixed frequency with a period that is divided into two intervals to an electromagnetic valve. During the first interval the electromagnetic valve is kept in a first operational position and during the second interval it is kept in a second operational position. The computer varies the intervals according to an algorithm for rapid actuation of the working cylinder.

6 Claims, 1 Drawing Sheet

PRESSURIZED FLUID DEVICE

The invention concerns a pressurized fluid device as specified in the introduction of claim 1.

A device of the above-mentioned type is disclosed in U.S. Pat. No. 4,543,856, which is used in an automotive transmission shifting mechanism for effecting engagement of the respective gears of a gear box with a force that varies in accordance with the gear selected. The gearbox can be operated by means of a gear lever which influences the piston of a double acting, master cylinder with a pressure fluid.

With different gearboxes there may be a need for different forces and power paths during the gear shift. This may involve a need for proportional valves with different characteristics and thereby possibly of a different size and design. In order to cover the varying requirements, many different proportional valves therefore have to be manufactured, thus reducing the size of the series for production of the valves and increasing the price thereof. Furthermore, such valves comprise many components and components with fine dimensional tolerances, thus further increasing the production costs, the storage costs etc. and thereby the price.

The object of the device according to the invention is to provide an inexpensive pressurized fluid device of the type mentioned in the introduction which is not encumbered by the above-mentioned disadvantages.

The characteristics of the pressurized fluid device according to the invention are presented in the characteristic features indicated in the claims.

The invention will now be described in more detail with reference to the drawing, in which FIG. 1 is a schematic connection diagram for a first embodiment of the pressurized fluid device according to the invention.

Figure 1:
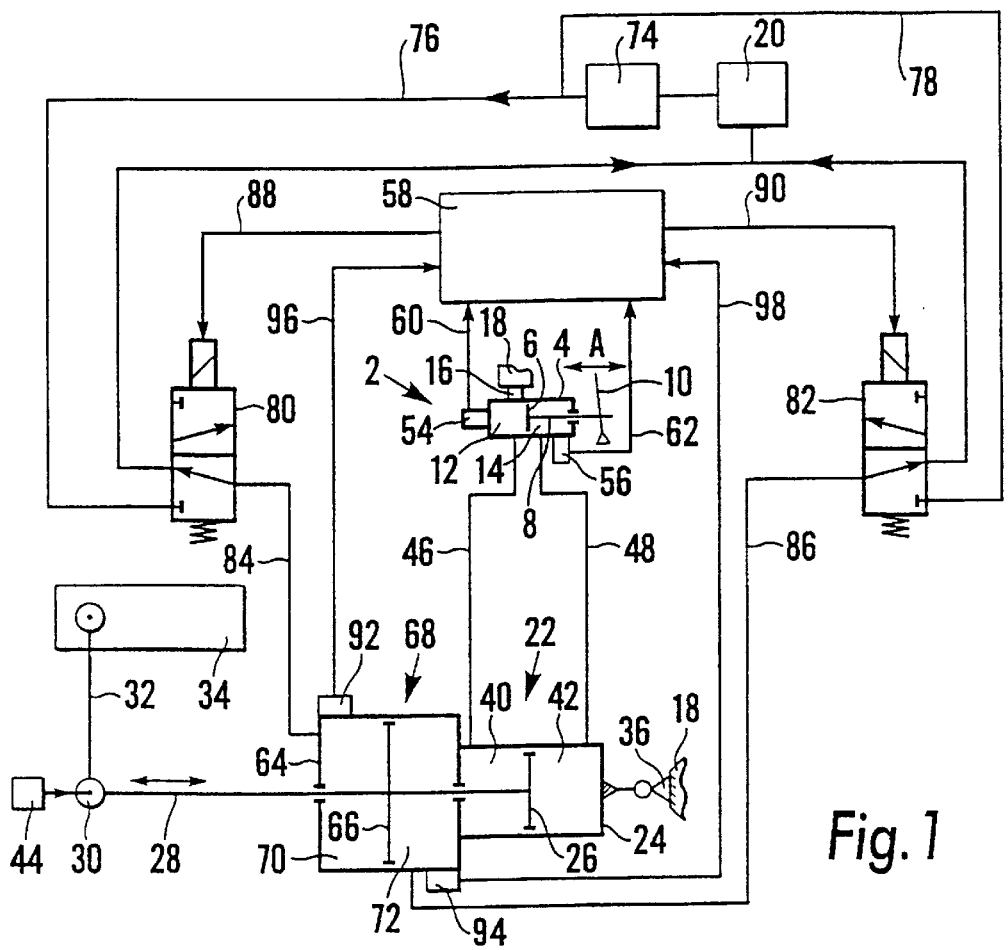

As illustrated in FIG. 1 the pressurized fluid device comprises a double-acting master cylinder 2 with a cylinder member 4 and a piston member 6. The master cylinder 2 works with an operating fluid. A piston rod 8 of the piston member 6 projects sealingly out of the cylinder member 4. The piston member 6 is arranged to be operated via the piston rod 8 by an operating rod 10 by movement of its upper section in the direction of the double arrow A. The cylinder member 4 and the piston member 6 define a first and a second cylinder space 12 and 14 respectively. The cylinder member 4 is connected via a bracket 16 to, e.g., a chassis 18 of a vehicle (not shown).

The pressurized fluid device further comprises a corresponding double-acting working or slave cylinder 22 with a cylinder member 24 and a piston member 26. A piston rod 28 projects sealingly out of the working cylinder member 24 and is articulated at 30 with an operation member which is composed of a rod 32 for operation of a device such as a gearbox 34 of the vehicle. The working cylinder member 24 is articulated via a bracket 36 with the vehicle's chassis 18. The working cylinder's cylinder member 24 and piston member 26 define a third and a fourth cylinder space 40 and 42 respectively.

The first and the third cylinder space 12 and 40 respectively are interconnected via a first line 46, and the second and the fourth cylinder space 14 and 42 respectively are interconnected via a second line 48, via which lines the operating fluid can flow from the master cylinder to the working cylinder and vice versa.

Each of the first and second cylinder spaces is connected to a pressure sensor 54 and 56 respectively which is arranged to establish the amount of pressure in the operating fluid in the respective cylinder spaces and lines, convert this amount to a corresponding electrical signal or impulse, and transmit this signal to a computer 58 via respective electrical wires 60, 62.

The working cylinder's piston rod 28 also extends sealingly through a cylinder member 64 of a servo-cylinder 68, and is securely connected to a piston member 66 of the servo-cylinder 68. The servo-cylinder's piston member 66 and the cylinder member 64 define a fifth and a sixth cylinder space 70 and 72 respectively.

A servo-pressure source, such as an air pump 74, is arranged to draw in a servo-fluid from a reservoir 20 and compress it. The servo-fluid may, e.g., be air from the environment, which may thereby constitute the reservoir. The air pump 74 is connected via a line 76, a first valve 80 and a line 84 to the fifth cylinder space 70 of the servo-cylinder 68, and connected via a line 78, a second valve 82 and a line 86 to the sixth cylinder space of the servo-cylinder.

In the illustrated example the valves 80, 82 are two-position, three-port magnetic valves and are connected to and controlled by the computer 58 via respective electrical wires 88, 90. When they are located in a first position, the valves are arranged to provide communication between the lines 76 and 84 and 78 and 86 respectively. When they are located in a second position, they are arranged to provide communication between the lines 84 and 86 and the air reservoir.

The servo-cylinder's fifth and sixth cylinder spaces 70, 72 are connected to the computer 58 via respective third and fourth pressure sensors 92, 94 and electrical wires 96, 98, the pressure sensors 92, 94 being arranged to establish the amount of pressure in the cylinder spaces 70, 72 and convert these amounts to corresponding electrical signals.

The computer 58 contains a program with an algorithm concerning a desired pressure for the servo-fluid in the fifth and the sixth cylinder spaces 70, 72 as a function of the actual pressure in the operating fluid in the first and the second cylinder spaces 12, 14. The algorithm causes the computer 58 to periodically, i.e. at a frequency, transmit a number of signals to one or both valves 80, 82 for repeated, continuous opening and closing thereof. This algorithm may be formulated in such a manner that the actual pressure of the servo-fluid in the relevant cylinder space rapidly converges towards the desired pressure and it will be possible for a person skilled in the art to set this up on the basis of this example. The signal period T is divided into a first interval T1, during which the valve is located in the first position, and a second interval T2, during which the valve is located in the second position, T being regarded in this case for the sake of simplicity as corresponding to Ti+T2 and disregarding the relatively short time which is necessary in order to bring the valve from one operational position to the other. During operation of the pressurized fluid device, the extent of the period T may, e.g., be constant, while the intervals Ti and T2 may vary. However, T and thereby the frequency whereby the computer 58 transmits its control signals to the valves may also be variable. Thus the frequency may, e.g., be 0 when the pressure of the operating fluid is below a certain value, i.e. when the master cylinder is not in operation, in order to ensure minimum wear on the valves' components, since the valves are not supplied with operation signals with the period T until the master cylinder is in operation and the pressure of the operating fluid in one of its cylinder spaces exceeds a certain threshold value. Furthermore, the frequency may be varied depending on which pressure variations can be tolerated. During the operation of the servo-cylinder a fluctuation will occur in the pressure of the servo-fluid in the respective servo-cylinder spaces about a mean value. T, T1 and T2 may therefore be varied depending on a desired mean pressure in these spaces.

The air pump's supply pressure is naturally greater than the pressure required in the servo-cylinder 68 for operation thereof, i.e., e.g., to obtain a gear shift. By means of a periodic operation of the valves 80, 82 and an appropriate variation of the intervals T1 and T2 during the same period, in the fifth and sixth cylinder spaces 70, 72 of the servo-cylinder an air pressure can be achieved which can be varied between the highest pressure attainable by the air pump, and the pressure of the servo-fluid in the reservoir 20.

The mode of operation for the pressurized fluid device is as follows:

During operation the computer 58 receives continuous signals from the sensors 54, 56 concerning the pressure of the operating fluid in the first and the second lines 46 and 48, and from the sensors 92, 94 concerning the pressure of the servo-air in the respective cylinder spaces of the servo-cylinder 68. Moreover, the computer 58 transmits signals periodically to the valves 80, 82. The computer's algorithm can be of such a nature that these signals cause the valves to provide a constant connection between the servo-cylinder's cylinder space and the reservoir if the interval T2 is equal to the period T when the operating rod 10 is not in operation.

For operation of the gearbox 34 the piston rod 10 is initially moved in the desired direction, e.g. to the left in relation to the reader, with the result that the master cylinder's piston is also moved to the left.

By means of such an operation, operating fluid in the left-hand, first cylinder space 12 is forced into the first line 46 and the third cylinder space 40 of the working cylinder 22, thus causing an increase in the pressure of the operating fluid in these cylinder spaces 12, 40 and the line 46. On account of this increase in pressure an attempt is made to move the working cylinder's piston member 26 towards the right. It should further now be understood that an operation of the rod 32 by means of the working cylinder 22 alone by operating the operating rod 10 will necessitate high pressure in the operating fluid and a correspondingly strong operating force, which is undesirable when changing gear during normal operation of the vehicle, since constant operation of a cumbersome operating rod 10 is tiring for the vehicle's driver.

The increased pressure in the third cylinder space 40, however, is established by the first pressure sensor 54 and communicated to the computer 58 in the form of a corresponding electrical signal. The computer 58 then transmits a signal to the first valve 80, thus causing the interval T1 to be increased and the interval T2 correspondingly reduced, resulting in an increase in the pressure of the servo-air in the fifth cylinder space 70 in the servo-cylinder 68. As mentioned above, signals concerning the pressure of the servo-fluid are also communicated to the computer 58 via the sensors 92, 94. When the pressure of the servo-fluid in the fifth cylinder space 70 has reached a value which is preassigned to the actual pressure of the operating fluid in the first cylinder space in the working cylinder, the mean pressure of the servo-air in the fifth cylinder space 70 is kept constant due to the fact that the computer 58 sets an appropriate ratio between T1 and T2. The total force which is exerted on the working cylinder's piston member 26 and the servo-cylinder's piston member 66 is now sufficiently great to permit the gearbox's rod 32 to be moved and a gear shift obtained. During this operation the sixth cylinder space 72 may communicate constantly with the reservoir 20.

When the gear shift has been completed and the operating rod 10 is no longer in operation, a reduction in the pressure of the operating fluid results in a reduction in the pressure of the servo-fluid, since the computer 58 hereby transmits signals to the first valve 80 for an increase in the second interval T2 and thereby during a relatively longer interval during the period T to create communication between the fifth cylinder space 72 and the reservoir 20.

Even though it is stated in the above description of the pressurized fluid device's mode of operation that the pressure of the servo-fluid in the servo-cylinder's cylinder space 70, 72 initially corresponds to the pressure of the servo-fluid in the reservoir since the interval T2 is equal to the period T and the cylinder spaces are constantly connected to the reservoir, it will be understood that from the start the computer 58 can also provide a periodic connection between both cylinder spaces 70, 72 and the pump 74, with the result that in the fifth and the sixth cylinder spaces 70, 72 there exists an overpressure, i.e. a pressure which, e.g., may be less than the maximum pressure which the pump can supply, but greater than the pressure of the servo-fluid in the reservoir. This can be advantageous for rapid attainment of a large differential pressure over the servo-piston and a very fast gear shift, since one of the servo-cylinder's cylinder spaces can be connected to the reservoir and the other to the pump.

The pressurized fluid device according to the invention has been described above in connection with a gearbox for a vehicle and a double-acting master cylinder/working cylinder system. It will be understood, however, that it may be employed for other purposes or used in connection with a single-acting master cylinder/working cylinder system, in which case the master cylinder and the servo cylinder each has only one pressure sensor and a return movement of the working cylinder device's piston member can be provided by means of a return spring or the like. Moreover, it can be envisaged that the working cylinder device does not comprise a working cylinder, but only a servo-cylinder, in which case the first and the second sensors only establish that the pressure in the first and the second master cylinder space has increased and possibly by how much. In order that in this case too it should still be possible to move the operating rod 10 to enable the vehicle's driver to perform a movement thereof corresponding to the movement during a conventional gear shift, it may be spring-loaded, or the first and the second cylinder spaces may be connected to respective hydraulic accumulators.

In the above the servo-fluid is specified as air, but may instead be another gas or a liquid.

The computer 58 may further be easily programmable or adjustable for simple alteration of the algorithm concerning, e.g., the frequency of the signals which are transmitted to the valves, and the intervals T1 and T2. This frequency may be variable by means of the algorithm or be fixed during the operation of the device and easily adjustable by means of the computer. For example, the frequency may be between 25 and 100 Hz. Furthermore it may be envisaged that in addition to the fifth and the sixth sensor 92, 94 at least one sensor is provided which can establish the movement characteristics and the position of the piston rod 28 of the working cylinder for transmission of a feedback signal to the computer, thus enabling the servo-cylinder spaces to be connected to the servo-fluid reservoir when, on the basis of the feedback signal, the computer has received a signal that a gear shift has taken place.

In this case the object of the working cylinder is to also ensure the possibility of a non-servo-assisted gear shift if a failure should occur in the servo-components of the device.

Figure 2:
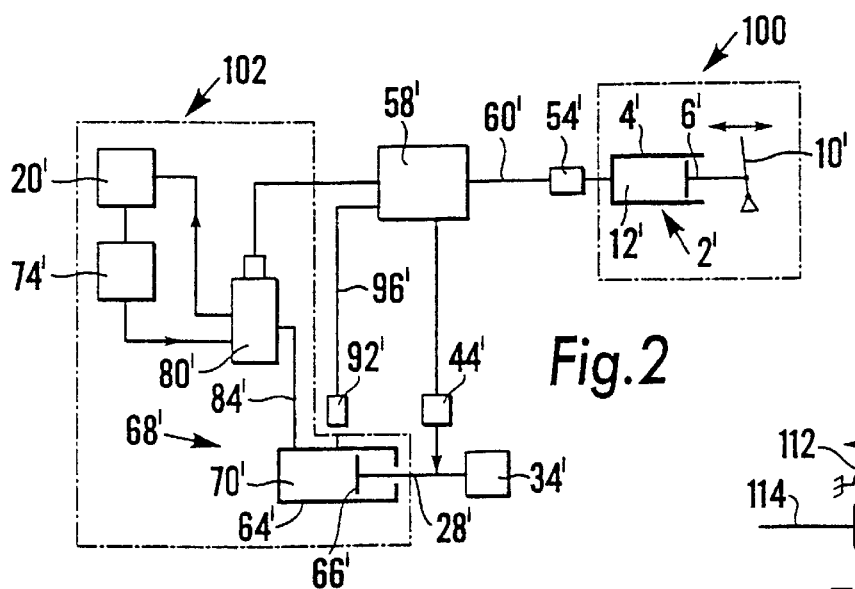
FIG. 2 is a schematic connection diagram for a second, simpler embodiment of the pressurized fluid device according to the invention.

FIG. 2 is a connection diagram which resembles what is illustrated in FIG. 1, but which is concerned with a simplified pressurized fluid device.

For components of this simplified pressurized fluid device reference numerals which correspond to reference numerals for corresponding components of the above-described device will be used, but with the addition of an apostrophe. The term pipe system in the following should be understood to refer to a group of co-operating components, and the term pipe system should be understood to mean that these components are hydraulic or pneumatic components.

As illustrated in this figure, the pressurized fluid device comprises a first and a second pipe system 100 and 102 respectively. The first pipe system comprises a single-acting master cylinder 2', such as a hydraulic cylinder and possibly with an associated reservoir (not shown) for a hydraulic fluid hereinafter called operating fluid, such as a hydraulic fluid for filling the master cylinder. The master cylinder has a cylinder member 4', a piston member 6', a master cylinder space or first chamber 12' and an operating rod 10' whereby the piston member 6' can be moved in the cylinder member 4'.

The second pipe system comprises a fluid reservoir 20', a fluid pump 74' which can be supplied with fluid from the reservoir 20' and deliver fluid at an increased pressure, a valve 80' of the same type as the above-mentioned valves 80, 82, which can be supplied with pressurized fluid from the pump 74' and a servo-cylinder 68' with a cylinder member 64', a piston member 66', a servo-cylinder space or second chamber 70' and a piston rod 28' whereby a device 34' can be operated. The fluid, hereinafter called the servo-fluid, may be a gas or a liquid.

Depending on the valve's operational position, it may either provide connection between the fluid pump 74' and the second chamber 70', or connection between this chamber 70' and the reservoir 20'.

In addition the pressurized fluid device comprises two pressure sensors 54' and 92' and a computer 58'. One pressure sensor 54' is mounted on the master cylinder 2' and arranged to establish the pressure of the operating fluid in the first chamber 12'. The second pressure sensor 92' is mounted on the servo-cylinder and is arranged to establish the pressure of the servo-fluid in the second chamber 70'. The pressure sensors 54', 92' are arranged to convert the established pressure to electrical signals and transmit these via respective wires 60', 96' to the computer 58'. The latter is arranged to transmit continuous periodic electrical signals with a period T to the valve 80' in order to move it at a certain frequency between its two operational positions, as explained above in connection with FIG. 1.

By means of this simplified device, an operation of the device 34' will be able to occur when the pressure in the master cylinder exceeds a predetermined value. By means of a possible further sensor 44' which senses the piston rod's movement and which is similarly connected to the computer, it can also control the operation's characteristics, such as operational speed or the sequence of operational movement for the device 34'.

Figure 3:
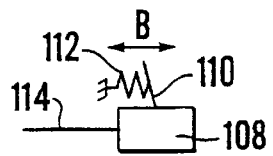
FIG. 3 is a view of an alternative form of an operating device for the embodiment illustrated in FIG. 2.

In FIG. 3 a system is illustrated which constitutes a control or operating device which can replace the first pipe system according to FIG. 2.

The reference numeral 108 indicates a signal device which is arranged to transmit electrical signals to the computer 58'. The signal device 108 may comprise, e.g., a voltage source and a device comprising a potentiometer or a piezoelectric device, which can be switched by hand as indicated by the double arrow B by means of an operating rod 110, with the result that via a wire 114, corresponding to the wire 60' in FIG. 2, a variable electrical signal can be delivered to the computer 58'.

In order that the signal which is delivered to the computer 58' should be substantially proportional to the force, which the person who operates the operating rod 110 exerts thereon, the operating rod may be spring-loaded as indicated by a spring 112, which connects the operating rod to the vehicle's chassis 18.

What is claimed is:

1. A pressurized fluid system for operating a device, comprising:

a hydraulic or pneumatic primary pipe system including a master cylinder with at least one cylinder space forming a primary chamber, an operating body for operation of the master cylinder by an increase in the pressure of operating fluid in the primary chamber, and at least one primary pressure sensor arranged to detect the pressure of the operating fluid and transmit a primary electrical corresponding to that pressure;

a working cylinder device having a cylinder space to form a secondary chamber;

a secondary pipe system for generating a secondary pressure on a secondary fluid in the secondary chamber as a function of the primary signal, the secondary pipe system including a fluid reservoir, a fluid pump for receiving the secondary fluid from the reservoir and discharging the secondary fluid under pressure to the secondary chamber, at least one electromagnetic valve with first and second operational positions, the first operational position connecting the fluid pump to the secondary chamber for supply of pressurized fluid thereto, the second operational position connecting the secondary chamber with the fluid reservoir for removal of fluid therefrom, and at least one secondary pressure sensor to detect the secondary pressure and transmit a secondary electrical signal corresponding to the secondary pressure; and a computer for controlling the electromagnetic valve;

wherein the computer is arranged to receive the primary and secondary electrical signals, and to transmit electrical signals at a fixed frequency with a period (T) to the at least one electromagnetic valve, the period (T) being divided into a first interval (T1), during which the electromagnetic valve is kept in the first operational position, and a second interval (T2), during which the electromagnetic valve is kept in the second operational position, the intervals (T1 and T2) being variable by the computer according to an algorithm, a mean pressure in the secondary chamber during the alternating supply and removal of the secondary fluid from the secondary chamber corresponding to the secondary pressure, and wherein the working cylinder device exerts an operating force corresponding to the secondary pressure.

2. The pressurized fluid device of claim 1, wherein the working cylinder device comprises a working cylinder, a servo cylinder, and interconnected working and servo pistons in the respective working and servo cylinders, the servo cylinder is connected to the fluid pump or to the reservoir via the at least one electromagnetic valve, and the working cylinder is connected to the master cylinder.

3. The pressurized fluid device of claim 1, wherein the master cylinder and the working cylinder device are double-acting and each include a pair of cylinder spaces, and including two operating fluid leads between the master and cylinder devices, two primary sensors, two secondary sensors, and two electromagnetic valves.

4. The pressurized fluid device of claim 3, wherein the computer is arranged to maintain overpressure simultaneously in the cylinder spaces of the double-acting servo cylinder.

5. The pressurized fluid device of any one of claims 1–4, wherein the frequency for the signals emitted by the computer is between 25 and 100 Hz.

6. The pressurized fluid device of claim 5 wherein the frequency for the signals emitted by the computer is variable.

* * * * *